United States Patent [19]

Nambu

[11] 4,396,109

[45] Aug. 2, 1983

[54] DEVICE FOR CAUSING HOLDERS TRANSPORTING OBJECTS TO RELEASE THE OBJECTS

[76] Inventor: Tatsuo Nambu, c/o Nambu Electric Co., Ltd., 55, Kisshoin Ikenouchi-cho, Minami-ku, Kyoto, Japan

[21] Appl. No.: 275,198

[22] Filed: Jun. 19, 1981

[30] Foreign Application Priority Data

Jun. 30, 1980 [JP] Japan .................................. 55-89606

[51] Int. Cl.³ ............................................ B65G 47/26
[52] U.S. Cl. .................................... 198/431; 198/437; 198/440; 198/478; 198/479
[58] Field of Search ............... 198/431, 437, 440, 479, 198/631, 653, 694, 695, 696, 478, 802, 426, 427

[56] References Cited

U.S. PATENT DOCUMENTS 2,408,599 10/1946 Bennett ............................ 198/631

FOREIGN PATENT DOCUMENTS 1098507 1/1968 United Kingdom ................ 198/431

*Primary Examiner*—Joseph E. Valenza
*Assistant Examiner*—Jonathan D. Holmes
*Attorney, Agent, or Firm*—Fidelman, Wolffe & Waldron

[57] ABSTRACT

A device for causing holders transporting objects to release the objects so as to place them at predetermined positions. The holders comprise a rotatable shaft, and a driving arm and an object-gripping arm both connected to the rotatable shaft and are carried by an endless conveyor so that the holders pick up an object at a first station and release the object at a second station. As the holders are conveyed from the first to the second station, the object-gripping arm gripping an object is kept parallel with the running direction of the conveyor. At the second station the driving arms of the holders are selectively moved into engagement with a device to turn the object gripping arm from the parallel position to a position perpendicular to the running direction of the conveyor and the object is released.

19 Claims, 12 Drawing Figures

DEVICE FOR CAUSING HOLDERS TRANSPORTING OBJECTS TO RELEASE THE OBJECTS

This invention generally relates to an apparatus for transporting objects by holders and more particularly to a device for use in such transporting apparatus for causing the holders to release the objects they are holding so that the objects may be placed at predetermined positions.

For marketing objects such as shell eggs and damageable fruits in retail stores it has been customary to separate them according to their size and/or quality and put them in containers for packaging. For example, eggs are available in the market in a package containing ten eggs of much the same size or weight. Various types of machines have been proposed for effecting such separation and packaging automatically.

One known machine is provided with a plurality of grippers or holders arranged on an endless belt or chain, so that as the chain is driven to run, one of the holders after another picks up an egg at a first station where eggs are supplied and transports the egg to a second station at a predetermined distance away from the first and releases the egg into a container made of plastic material.

With this arrangement, however, if the holder is running when it releases the egg, the velocity of the holder in the direction of transport will cause a serious problem.

The egg released from the holder which is running drops aslant in the running direction of the holder due to the horizontal component of the velocity of the holder. As a result, the egg dropping into one of the cavities of the tray portion of the plastic container or carton is likely to collide on the side with the egg previously received in the adjacent cavity so that the eggs are damaged or broken.

The present inventor previously proposed a method and apparatus for discharging an object from a holder, which have successfully removed such danger as mentioned above. The method and apparatus are disclosed in copending U.S. patent application Ser. No. 206,952 filed Nov. 14, 1980.

In accordance with the method disclosed in the above U.S. application, as an object is being transported by a holder in a predetermined direction, the object is accorded a velocity having a direction the angle of which relative to the direction of transport gradually increases within the range of 90° to 180°, thereby to gradually decrease the velocity of the object in the direction of transport substantially to zero or below a predetermined value, whereupon the object is released from the holder so as to be placed accurately at a predetermined location. In other words, when the object is released from the holder, it is given a velocity having the same or approximately the same magnitude but a direction opposite to the direction in which the object is being transported, so that the velocity of the object in the direction of transport is offset or reduced.

A holder suitable for use in carrying out the above-mentioned method has also been disclosed in the above U.S. application.

It is one object of the invention to provide a device for causing the above-mentioned holder to release the object it is holding so that the object released can be put in a container or a carton to be packaged therein.

There are several types of containers or cartons for packaging eggs. They are generally made of plastic material and typically provided with two parallel rows of cavities for containing an egg therein, each row consisting of, say, five cavities.

A holder such as mentioned above takes up an egg at a first station and transports the egg to a second station, where the holder releases the egg to drop into one of the cavities of such a container as mentioned above previously placed at the second station. At this time it is required that the egg should drop not onto any egg that has already been in one of the cavities but into a vacant one of the cavities. If eggs of different sizes or weights are supplied to the first station where they are successively picked up by one holder after another, it is necessary to select eggs of the same size or weight to be put into the same container.

Another object of the invention is therefore to provide an apparatus for transporting objects to be put into a container for packaging, which meets the above requirements.

The invention will be described in detail with reference to the accompanying drawings, wherein.

Figure 1:
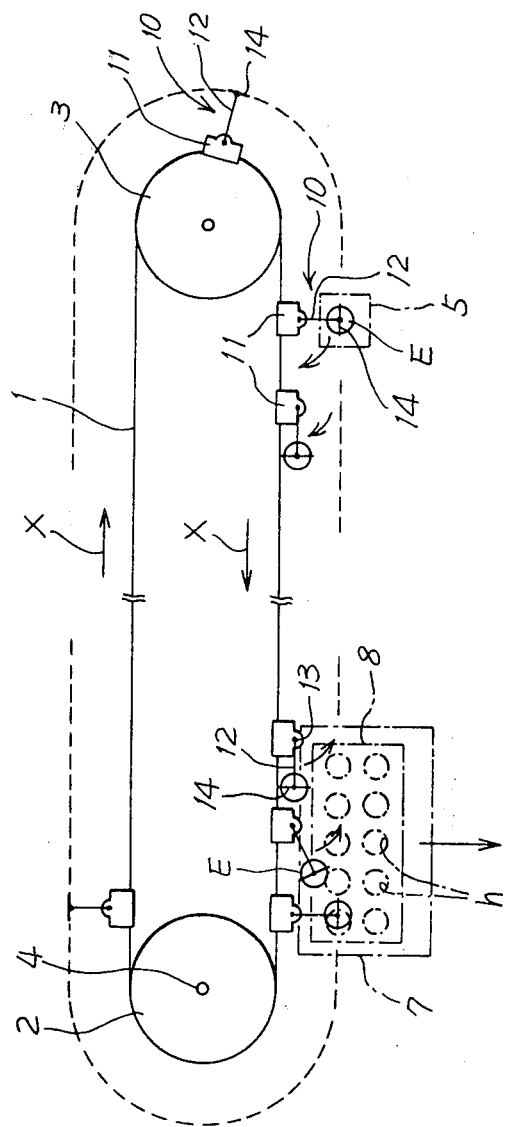
FIG. 1 is a top plan view schematically showing a method of transporting objects to be put into a container for packaging.

Now referring to FIG. 1, the previously mentioned method of the copending U.S. application will first be explained. According to this method, eggs are transported from a first station where holders successively take up eggs to a second station where the holders successively release or discharge the eggs to drop into a carton or a container for packaging.

There is schematically shown an endless chain 1 provided between a pair of sprocket wheels 2 and 3, one of which, say, the wheel 2 is fixed to a drive shaft 4 connected to a suitable drive not shown.

A plurality of holders 10 are secured to the chain 1 with a predetermined distance from each other along the length of the chain. Eggs E are supplied from a source such as an egg sorting machine not shown to a first station 5 provided near the chain. In practice, eggs of different sizes are supplied to corresponding different positions in the first station.

As the chain 1 is driven, the holders 10 circulate and as they come to the first station 5 they successively pick up the eggs supplied thereto and carry them horizontally in the direction of an arrow X or clockwise at a predetermined velocity V.

A tray or container 8 for packaging is placed at a second station 7 a predetermined distance downstream or leftward of the first station along the chain 1. The container 8 can be a conventional type of plastic and formed with a plurality, say, ten cavities h each for receiving an egg therein. The holders 10 that have transported the eggs to the second station 7 successively release the eggs to drop into the cavities of the container 8.

Each of the holders 10 has a plate member 11 shown as a block in FIG. 1, by which the holder is fixed to the chain 1. The holder also has a gripper arm 12 fixed to a shaft 13 which is rotatably supported by the block 11. The angle of rotation of the shaft 13 and consequently the angular range of turning of the arm 12 about the axis of the shaft 13 is the angle, that is, 90° between a first position (which will be referred to as the parallel position of the arm) where the arm 12 is substantially parallel with the direction X in which the chain 1 advances and where a gripper 14 provided at the outer end of the arm 12 is positioned forwardly or leftward of the rotatable shaft 13 in the direction X and a second position (which will be referred to as the perpendicular position of the arm 12) where the arm 12 lies substantially perpendicularly to the direction X.

As will be described in detail later, the gripper 14 is so designed as to pick up an egg at the first station (supply station) 5 and release the egg at the second station (packaging station) 7.

Suppose that the chain 1 is circulating clockwise in FIG. 1. The holder 10 on the chain arriving at the first station 5 has its gripper arm 12 in the perpendicular position relative to the direction X of movement of the running chain 1 and grips an egg by the gripper 14 at the station 5 as previously mentioned. As the holder 10 moves away from the first toward the second station, the arm 12 holding the egg is turned from the perpendicular to the parallel position.

As the holder 10 with its arm 12 in the parallel position approaches the second station 7, immediately before the station 7 the arm 12 begins to be turned counterclockwise on the shaft 13 toward the perpendicular position, whereupon the gripper 14 releases the egg. The arrangement is such that when the gripper releases the egg, the arm 12 has such an angular velocity that the velocity of the egg held by the arm relative to the mounting block 11 has a direction substantially opposite to that of movement of the chain and a magnitude as nearly equal to that of the velocity of the chain as possible.

To put it in more detail, as the gripper 14 with an egg gripped thereby is displaced from the parallel to the perpendicular position, in addition to the velocity V in the direction of X caused by the movement of the chain a velocity v in a negative direction relative to the direction X is accorded to the egg. As the arm 12 is swung from the parallel to the perpendicular position, the direction of the velocity v or the angle thereof relative to the direction X gradually increases from 90° to 180°, that is, the direction exactly opposite to the direction X of movement of the chain. When the angle becomes 180°, that is, the arm 12 is in the perpendicular position, the velocity v in the negative direction becomes equal to the velocity V in the direction X, whereupon the egg has no velocity component in any direction and stands motionless relative to the machine frame or the ground despite the movement of the chain in the direction X. Therefore, if the gripper releases the egg at that time, it gravitates substantially vertically.

Theoretically, the gripper must release the egg when the arm 12 is exactly in the perpendicular position, but practically a predetermined angular range is allowed within which the gripper may release the egg. The same is true with the parallel position of the arm. Therefore, in the present specification and claims the terms "parallel position" and "perpendicular position" of the gripper arm 12 should be taken to include a predetermined angular range.

The holder 10 is fixed by the mounting plate 11 to the endless chain 1 so as to face outwardly of the chain, which is driven to circulate in a horizontal plane. A plurality of holders 10 are mounted on the chain so that each of them is spaced a predetermined distance along the chain from the adjacent holders.

As shown in FIGS. 2 to 6, the mounting plate 11 of the holder 10 is provided with a bracket 15 fixed thereto and having a bearing for rotatably supporting the vertical shaft 13. The gripper arm 12 has its inner end connected to the lower end of the vertical shaft 13. The holder 10 is provided with a driving arm 16 having its inner end fixed to the upper end of the shaft 13.

The inner end of the arm 12 is pivoted by a pin 17 perpendicularly crossing the axis of rotation of the shaft 13 to the lower end thereof so that the arm 12 can pivot up and down about the pin 17. Since the holder 10 is fixed to the chain 1 with the axis of the rotatable shaft 13 extending vertically, the pivot pin 17 lies horizontally so that the arm 12 can pivot about the pin 17 between a lowered position in which the arm 12 has its outer end held down and a raised position in which the arm has its outer end held up. A pair of coil springs 18 somewhat schematically shown are provided between the gripper arm 12 and the driving arm 16 to bias the arm 12 upwardly to the above-mentioned upper or raised position.

Figure 3:
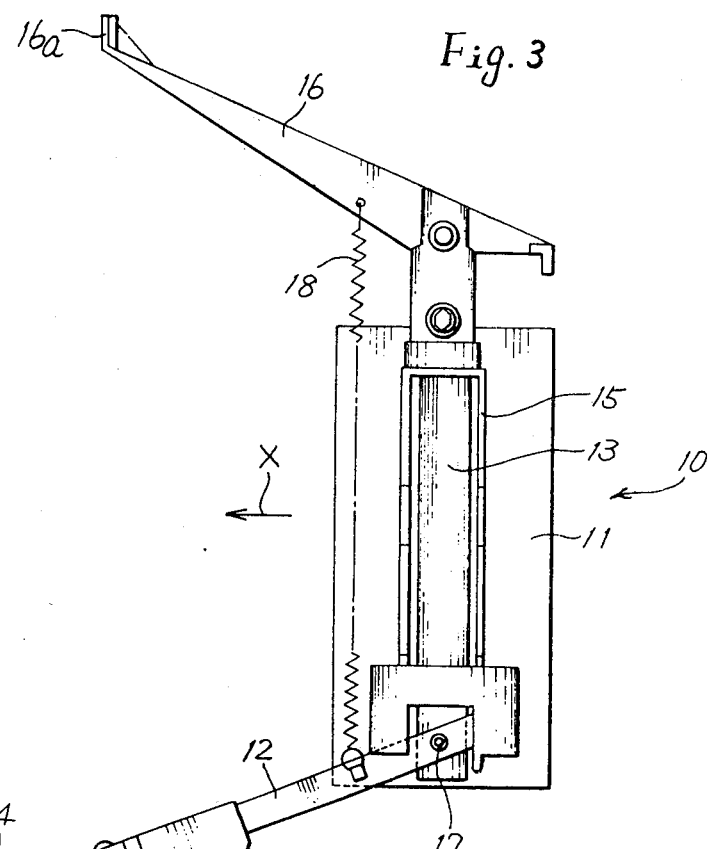
FIG. 3 is a front view of the holder shown in FIG. 2, with the gripper arm in the parallel and lowered position.

The arm 12 is provided at the outer end thereof with the gripping device 14. The gripper 14 grips an egg E in the lowered position of the arm 12 and releases the egg in the raised position thereof. As the arm 12 held in the perpendicular position is conveyed by the chain 1 to the supply or egg-gripping station (the first station) 5, the arm 12 and consequently the gripper 14 is lowered from the raised position (FIG. 5) to the lowered position (FIG. 3) and grips an egg at the first station 5. In FIG. 3 the arm 12 is shown in the parallel position to which the arm has been turned after it gripped the egg.

Figure 2:
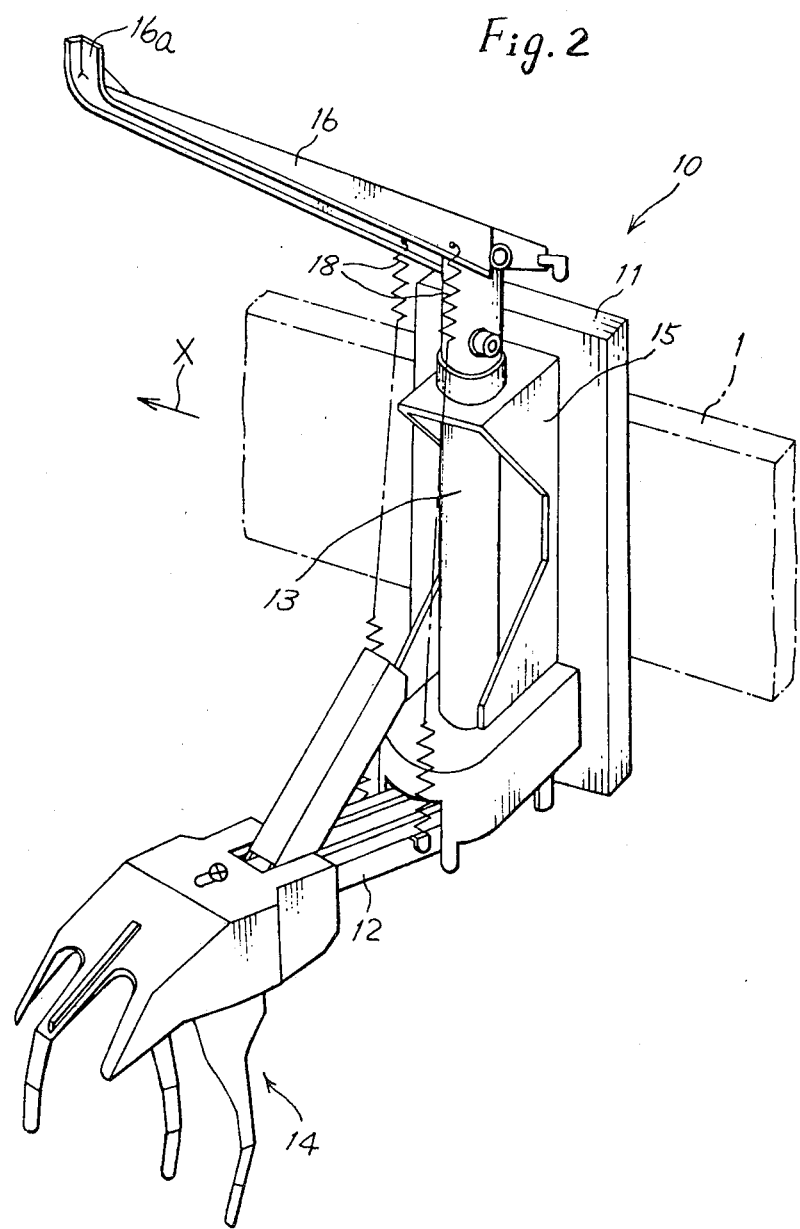
FIG. 2 is a perspective view of a holder suitable for use in the method of FIG. 1.
Figure 4:
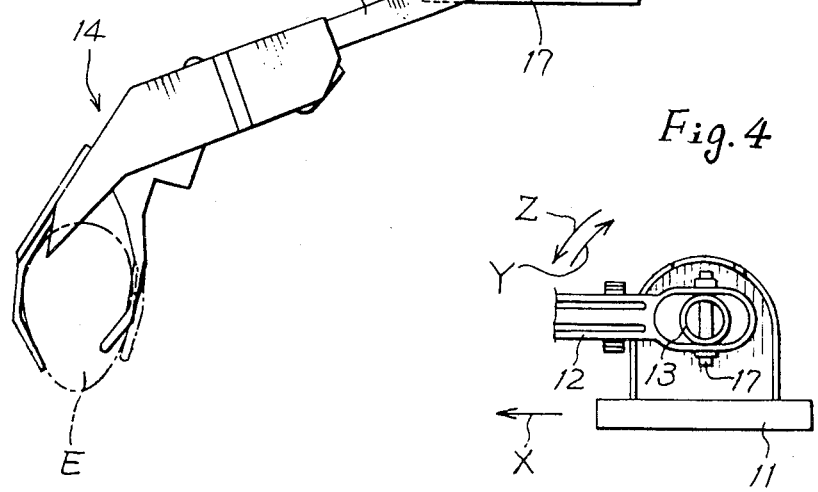
FIG. 4 is a bottom view of a portion of FIG. 3.
Figure 5:
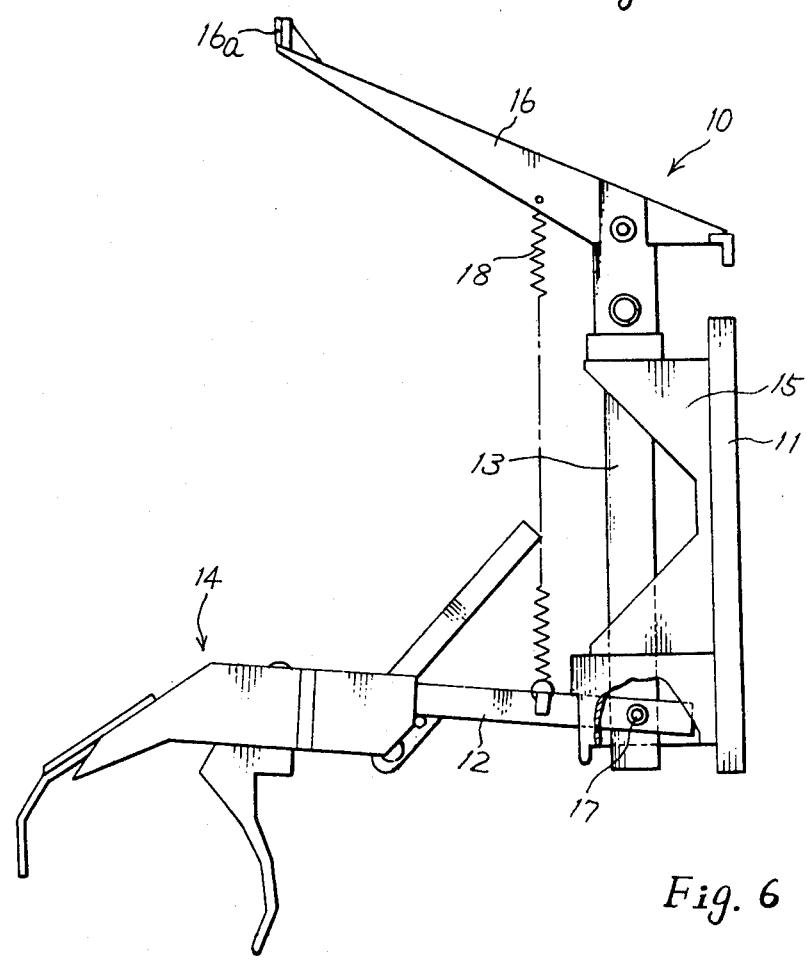
FIG. 5 is a side view of the holder shown in FIG. 2, with the gripper arm in the perpendicular and raised position.
Figure 6:
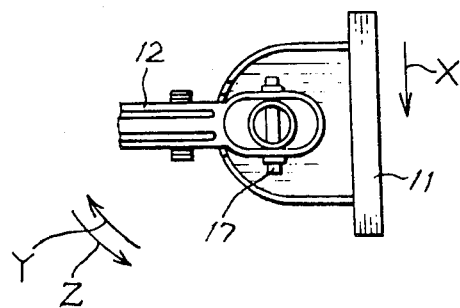
FIG. 6 is a bottom view of a portion of FIG. 5.

As the chain 1 runs to convey the holder 10 toward the packaging or egg-releasing station (the second station) 7, the arm 12 with the egg gripped by the gripper 14 is turned from the perpendicular to the parallel position in the direction Z as shown in FIGS. 3 and 4. Then, as the holder approaches the second station 7, the arm 12 is turned in the direction of Y in FIG. 4 from the parallel to the perpendicular position, where the holder 10 releases the egg (as shown in FIGS. 2 and 5) to drop into a specific one of the cavities of a carton 8 previously placed at the second station 7.

The detailed construction of the holder that enables the above operation of gripping and releasing an egg is given in the previously mentioned U.S. application, to which reference is to be made.

Turning to FIGS. 7 to 12, wherein the same reference numerals as in FIGS. 1 to 6 designate corresponding parts about which no explanation will be given, one embodiment of the invention will be described.

Along the path of transportation of the holders there are provided two packaging or egg-releasing stations 7A and 7B spaced an appropriate distance apart from each other along the path, so that eggs can be sorted into two groups of larger and smaller sizes which are packaged in different containers. Empty containers 8A and 8B are intermittently supplied by conveyors 60A and 60B, respectively, to the packaging stations 7A and 7B.

Since the construction and operation of the two conveyors 60A and 60B in these two lines and the manner in which eggs are dropped into the containers to be packaged are substantially the same, they are explained commonly, with the suffix "A" or "B" being omitted from the reference symbols, except where each of the two lines need to be explained individually.

Empty containers 8 are conveyed by the conveyor 60 to the packaging station 7 in the direction U perpendicular to the linear running direction X of the chain 1.

As previously mentioned, each container 8 is formed with ten egg-containing cavities or pits in two rows, with five cavities in each row. For convenience of explanation, of the two rows of cavities the one in front in the above-mentioned direction U will be referred to as the front row and the one at the rear, as the rear row. The cavities in the front row are numbered successively h-1, h-2, ... h-5 from the forward or downstream end in the running direction X of the holder gripping an egg, and the cavities in the rear row are numbered successively h-6, h-7, ... h-10 from the above-mentioned downstream end.

The container 8 on the conveyor 60 is first stopped at such a position (which will be referred to as the first waiting position) relative to the holder on the chain that the cavities in the front row of the container are placed immediately below the egg gripped by the gripper 14 of the holder when the gripper arm 12 of the holder has been turned from the parallel to the perpendicular position, and when all of the cavities in the front row have been occupied by eggs, the container is displaced forwardly in the direction U a distance equal to one row of cavities as far as a position (which will be referred to as the second waiting position) where the cavities in the rear row are positioned immediately below the egg held by the holder in the perpendicular position. When all of the cavities in the rear row as well as the front row have been occupied by eggs, the container is farther advanced in the direction U from the packaging station 7 while another empty container is brought to the first waiting position in the above-mentioned manner.

Suppose that an empty container 8 is in the first waiting position at each of the packaging stations 7A and 7B and that a first holder 10-1 has picked up a first egg E-1 at the egg-gripping station 5. For convenience of explanation, it is assumed that there is provided a single egg-gripping station 5, and that eggs of two different sizes, that is, a larger and a smaller size are supplied to the station 5, and that eggs of the larger size (or heavy weight) are to be put into a container 8A at the packaging station 7A while eggs of the smaller size (or light weight) are to be put into a container 8B at the packaging station 7B.

The eggs supplied to the station 5 are weighed by a suitable known weighing instrument before it is picked up by a holder. Suppose that the egg that has been picked up by the holder 10-1 is of the larger size, with no eggs of the larger size being held by the holders downstream of the holder 10-1 at that time. This egg is to be put into the cavity h-1 of the container 8A at the packaging station 7A.

If the second egg E-2 picked up by the next holder 10-2 is also of the larger size, this egg is also to be put into the next cavity h-2 of the same container 8A. If the third egg E-3 picked up by the third holder 10-3 is of the smaller size, the egg is to be put into the first one h-1 of the cavities in the other container 8B at the other packaging station 7B.

In this manner, the eggs successively picked up by the holders on the chain 1 as it circulates are put into the specific cavities of either of the two containers in accordance with their size and the order they have been picked up. This operation is controlled in the manner to be described later.

As previously mentioned, in order for the holder that is holding an egg to release it, the gripper arm 12 of the holder must be turned from the parallel to the perpendicular position. The turning movement of the arm 12 is effected through rotation of the shaft 13 by turning the driving arm 16. A plurality, say, five arm-turning devices 40-1 to 40-5 for turning the driving arms of the holders are provided along the chain 1 generally upstream of each of the packaging stations 7A and 7B.

The position of each of the arm-turning devices 40-1 to 40-5 relative to the container 8 at the packaging station 7 is so determined that the egg held by the holder to be turned by the operation of any one of the devices 40-1 to 40-5 will drop into a specific one of the cavities h-1 to h-10 of the container, as will be described hereinafter.

Opposite to the arm-turning devices 40-1 to 40-5 beyond the chain 1 there are provided five arm-pushing devices P-1 to P-5 for pushing the driving arm 16 of the holder. As will be described in detail later, when the driving arm 16 of a holder the gripping arm 12 of which is holding an egg is pushed by one of the pushing devices P-1 to P-5, the driving arm is engaged by the corresponding one of the arm-turning devices 40-1 to 40-5 so as to be turned to the perpendicular position, whereupon the arm 12 releases the egg.

The two groups of arm-turning devices 40-1 to 40-5 each paired with the corresponding one of the arm-pushing devices P-1 to P-5 in the two packaging stations 7A and 7B are substantially the same in arrangement and operation so that only one of the two groups will be explained. Also, the construction and operation of each of the five arm-turning devices and those of each of the corresponding five arm-pushing devices in each of the two groups are substantially the same so that only one of the arm-turning devices and the corresponding one of the arm-pushing devices paired therewith will be explained. In the following description, the numerals suffixed to the reference symbols 10, 40 and P will be omitted except where necessary for discrimination.

In FIGS. 9 to 12, a plate 41 supports a single arm-turning device 40 and a corresponding single arm-pushing device P. The arm-turning device 40 comprises a bearing member 42 fixed to a vertical wall 41a depending from the plate 41, an actuating rod 43 rotatably supported by the bearing member 42 and a restorer 44 connected to the actuating rod 43. The restorer 44 also functions as a damper.

The actuating rod 43 comprises a vertical portion 43a journaled in the bearing member 42, a main portion 43b extending downwardly aslant from the lower end of the vertical portion 43a and a hook-like portion 43c depending vertically from the lower end of the main portion 43b. The hook 43c is engageable with the corresponding recess 16a formed on the outer free end of the driving arm 16 of the holder 10 in a manner to be described in detail later. The support plate 41 is fixed to a suitable frame 47 of the machine.

The arm-pushing device P comprises a support block 61 fixed to the depending wall 41a of the support plate 41, a stopper 62 projecting horizontally from the support block 61, a pusher 63 pivotally supported by the support block 61, and an electromagnetic actuator 65 having a plunger 64 the outer end of which is pivotally connected to the pusher 63.

Figure 11:
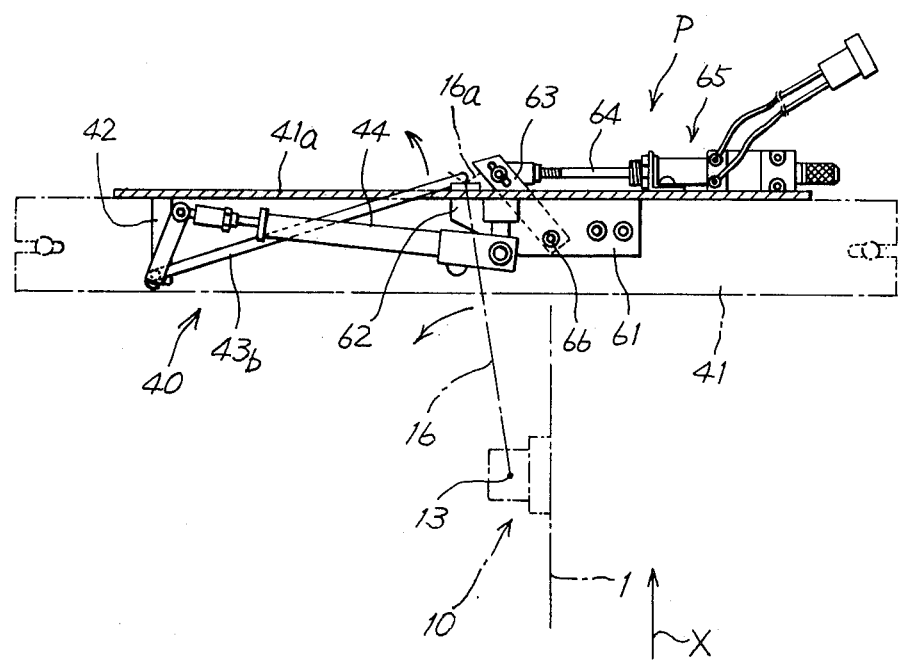
FIG. 11 is a sectional view along line A—A' of the device shown in FIG. 9.
Figure 12:
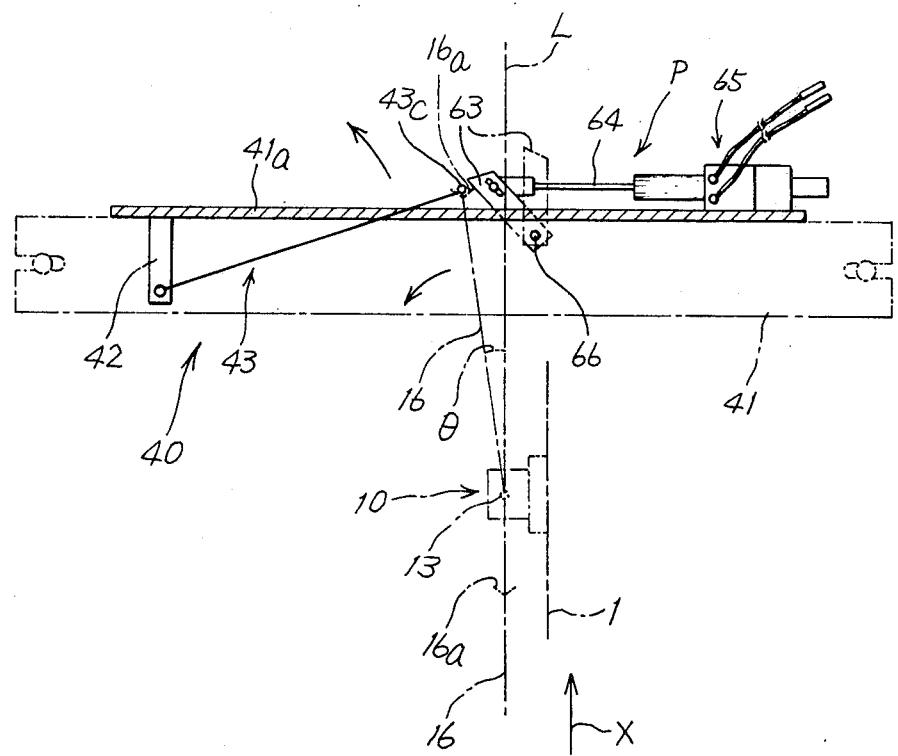
FIG. 12 is a simplified view of FIG. 11.

The pusher 63 is disposed at one side of the path L which the outer end 16a of the driving arm 16 of the holder 10 traces as the chain 1 circulates to advance the holder, and when the electro-magnetic actuator 65 is energized by a command signal to be described later, the plunger 64 is projected to cause the pusher 63 to be turned about the pivot pin 66 counterclockwise in FIGS. 11 and 12 into engagement with the outer end 16a of the driving arm 16 thereby to turn the arm 16 counterclockwise about the shaft 13 for $\theta°$ so that the outer end 16a of the arm 16 is engaged by the hook-like portion 43c of the actuating rod 43 of the arm-turning device 40.

Figure 8:
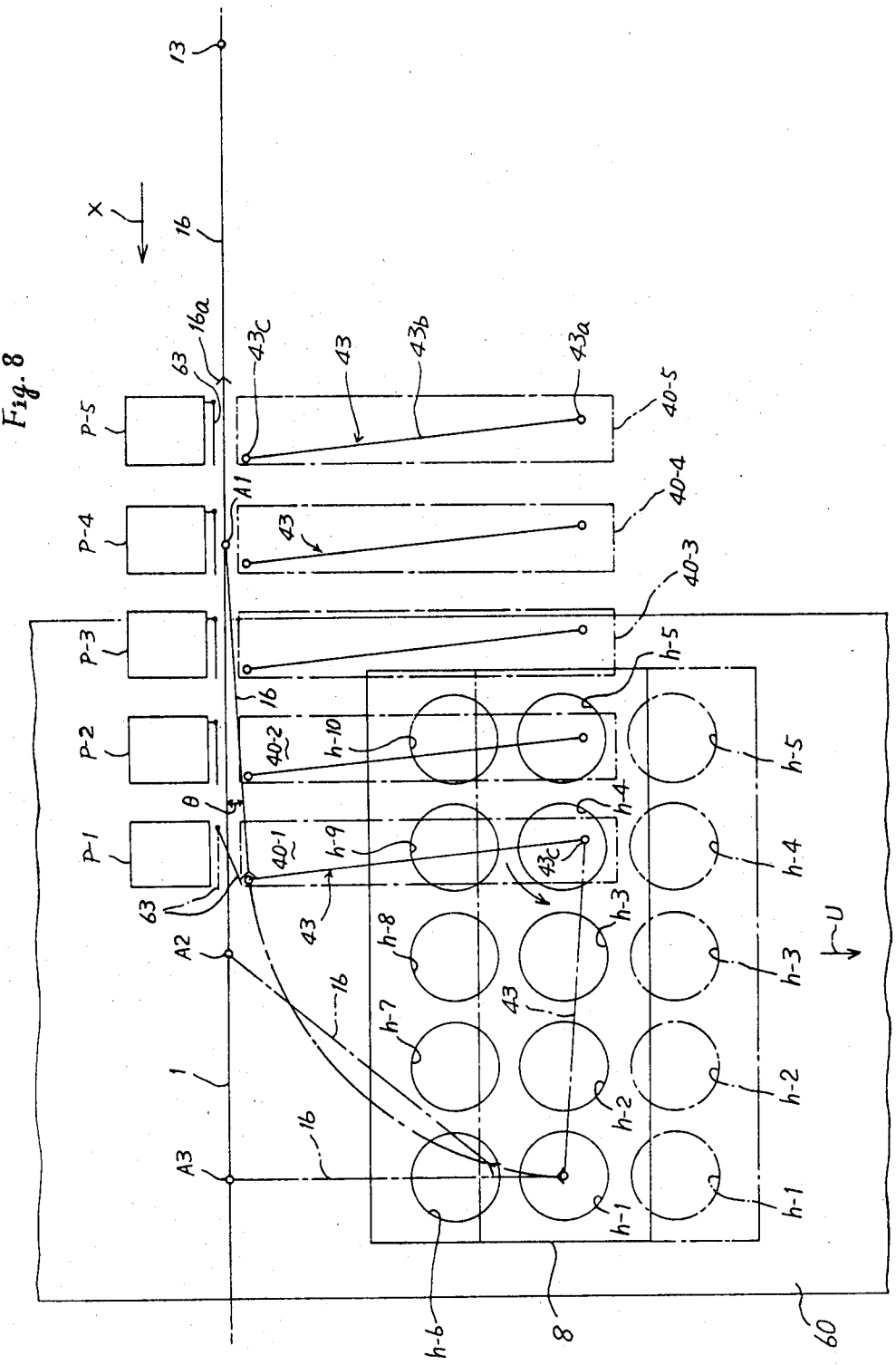
FIG. 8 is an enlargement view schematically showing the principal portion of the system of FIG. 7.
Figure 9:
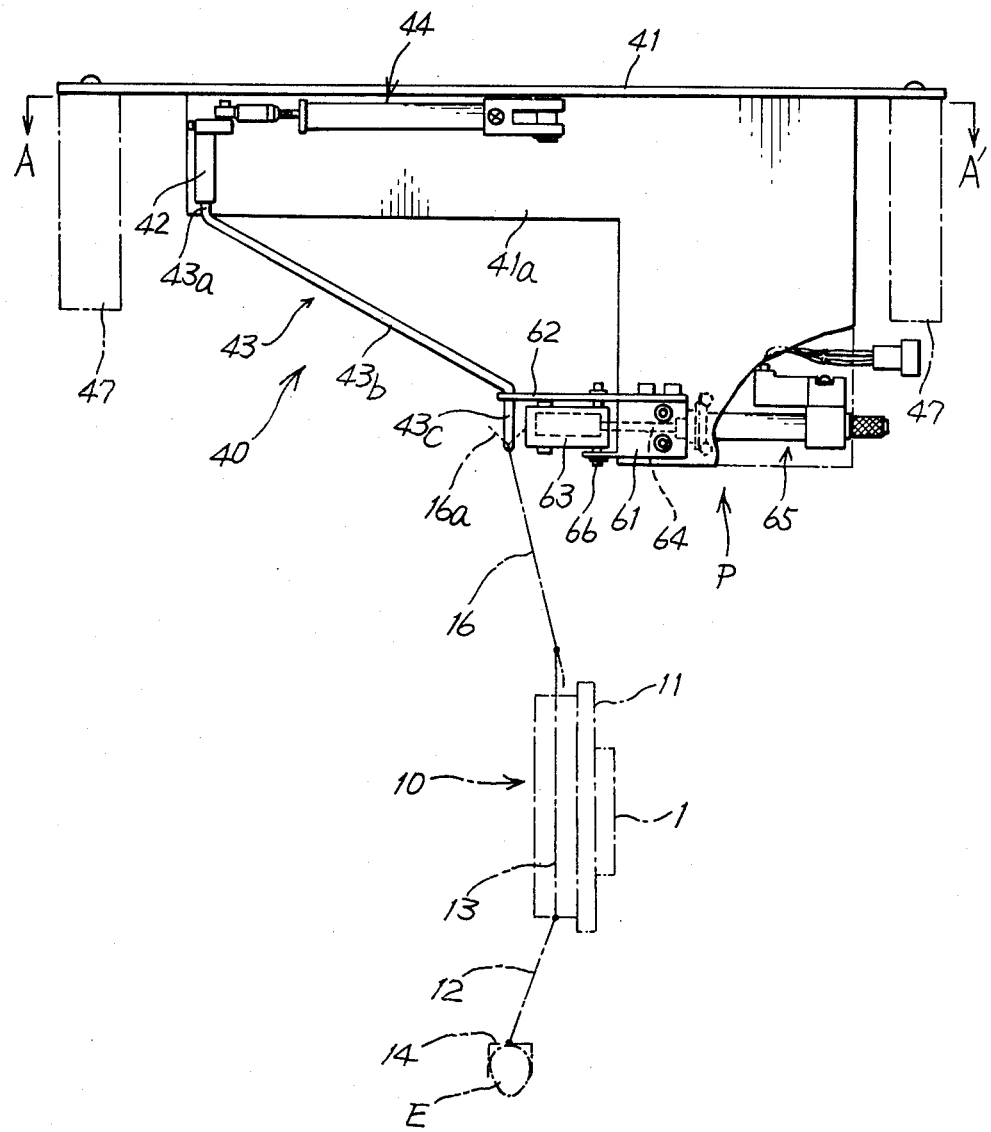
FIG. 9 is a side view of a device for turning the driving arm of the holder from the parallel to the perpendicular position.
Figure 10:
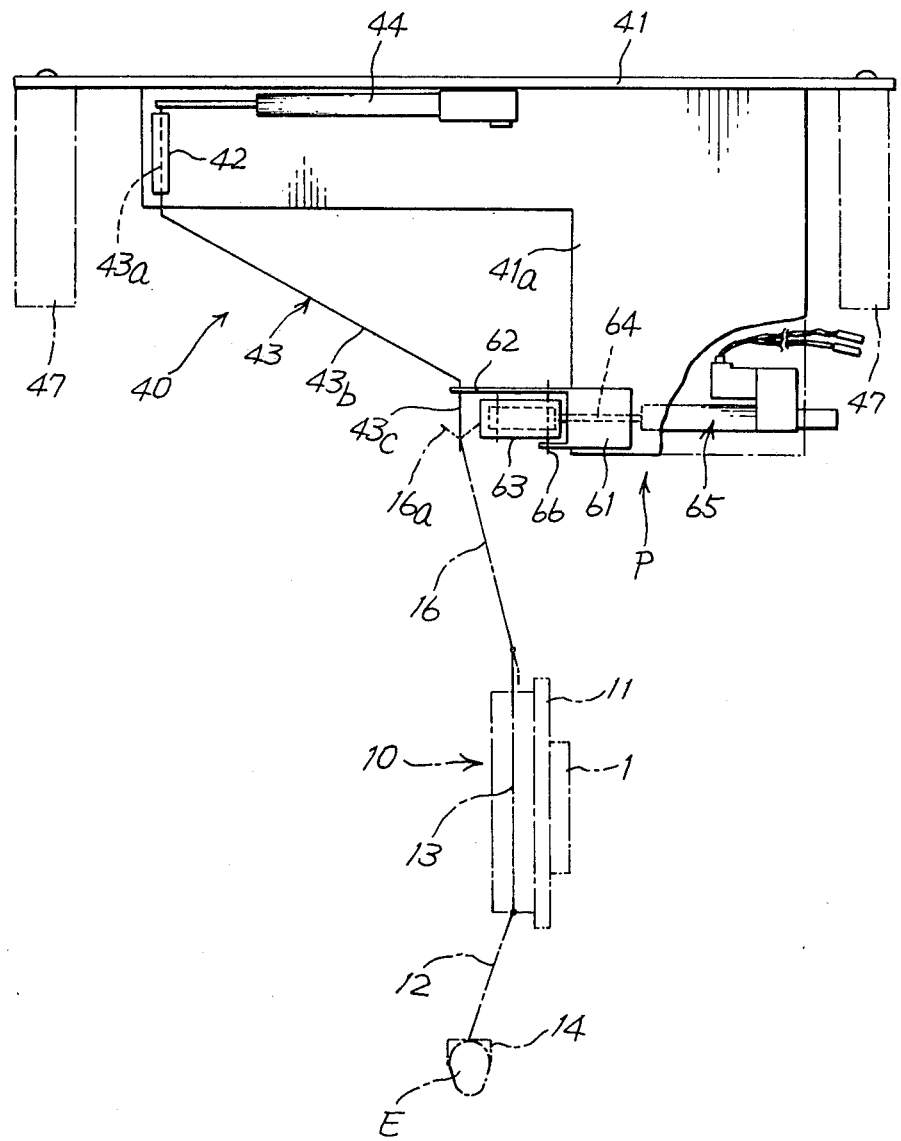
FIG. 10 is a simplified view of FIG. 9.

Suppose that at that time the rotatable shaft 13 of the holder is positioned at a point A1 in FIG. 8. As the older is transported in the direction X so that the shaft 13 moves through a point A2 toward a point A3 with the outer end 16a of the arm 16 being kept engaged with the hook-like portion 43c of the actuating rod 43, the actuating rod 43 is turned counterclockwise on the vertical portion 43a thereby to turn the driving arm 16 and consequently the gripper arm 12 of the holder counterclockwise on the shaft 13, and when the shaft 13 has reached the point A3, the driving arm 16 and the gripper arm 12 take the perpendicular position, whereupon the arm 12 release the egg.

As the holder farther advances in the direction X, the actuating rod 43 comes to be disengaged from the driving arm 16 so as to be returned by the restorer 44 approximately to the perpendicular position and abut on the stopper 62 to wait for the next holder to come.

Although the arm-turning devices 40-1 to 40-5 are arranged side by side close to each other, the actuating rods 43 have their main portions 43b inclined so that the turning of the actuating rod of each of the arm-turning devices does not obstruct or is not obstructed by the operation of the actuating rods of the adjacent arm-turning devices.

As previously mentioned, the eggs that have successively been picked up by the holders at the egg-gripping station 5 are successively put into the cavities h-1 to h-10 of either the container 8A or 8B in accordance with the sizes of the eggs and the order they were picked up. This operation may be effectively conctrolled by an electronic computer C in the following manner.

A suitable device 70 supplies eggs E of different sizes or weights one after another to the egg-gripping station 5 where a weighing instrument 70a weighs each of the eggs to produce a corresponding weight signal S1 to be sent to the computer C, which recognizes the size of each egg on the basis of the weight signal S1 and determines into which of the containers 8A and 8B each egg is to be put.

The computer C has stored therein informations such as which of the cavities of each of the containers 8A and 8B have already been occupied by eggs and which of the remaining vacant cavities are reserved for which of the eggs held by which of the holders now being transported. On the basis of the informations the computer C designates a specific one of the vacant cavities of a specific one of the containers in which the egg causing the weight signal S1 just received is to be put, and when the holder carrying the egg has arrived a position corresponding to the designated cavity, the computer C produces a command signal S2 to the arm-pushing device paried with that one of the arm-turning devices which corresponds to the designated cavity, so that when the outer end 16a of the driving arm 16 of the holder holding the egg has reached the pusher 63 of the specific arm-pushing device, the plunger 64 is projected to pivot the pusher 63 thereby to displace the driving arm 16 by $\theta°$ relative to the parallel position thereof to bring the outer end 16a of the arm 16 into engagement with the hook-like portion 43c of the actuating rod 43 of the arm-turning device, whereupon the plunger 64 is quickly restored to the original position.

As the chain 1 advances, the actuating rod 43 causes the arms 16 and 12 to be turned from the parallel to the perpendicular position in which the arm 12 releases the egg immediately above the designated specific cavity so that the egg drops into the cavity.

As mentioned above, it is necessary to actuate the pusher 63 of the arm-pushing device the moment the outer end 16a of the driving arm 16 of the holder holding an egg has arrived at the pusher. The timing may advantageously be determined in the following manner.

A pulse generator PG produces a predetermined number of clock pulses for each revolution of the drive shaft 4. The time from the moment an egg is weighed at the station 5 to the moment the outer end 16a of the driving arm 16 of the holder that picked up that egg has reached the pusher 63 of each of the arm-pushing devices P-1 to P-5 is determined beforehand in terms of the number of clock pulses produced during that time by the pulse generator PG. In other words, the distance an egg travels between the position where the egg is weighed and each of the arm-pushing devices P-1 to P-5 paired with the corresponding one of the arm-turning devices 40-1 to 40-5 is expressed as a certain fixed number of clock pulses produced by the pulse generator PG as the drive shaft 4 is rotated.

Therefore, if the clock pulses begin to be counted the moment an egg to be picked up by one of the holders on the chain has been weighed and when that number of clock pulses which correspond to that one of the arm-pushing devices which corresponds to that one of the cavities of a container into which the egg is to be put have been counted, the outer end 16a of the driving arm 16 of that holder must have reached the pusher 63 of that arm-pushing device, whereupon a signal S2 may be timely produced to pivot the pusher 63 of that arm-pushing device.

Since this method relies not on time delay but on clock pulses produced in accordance with the rotation or phase angle of the drive shaft 4, when a predetermined number of clock pulses have been counted, the outer end 16a of the driving arm 16 of a holder must have reached the pusher 63 of the corresponding arm-pushing device without being affected by any change or fluctuation in the running speed of the holder.

The storing of the above-mentioned predetermined numbers of clock pulses, the counting of the clock pulses, the production of the command signal to control the operation of the pusher and other operations are all controlled by the computer C.

The operation of the holder to pick up an egg at the egg-gripping station 5 and the operation to turn the gripper arm of the holder from the perpendicular to the parallel position are described in detail in the previously mentioned copending application Ser. No. 206,952, the relevant parts of the specification and drawings of which are to be incoporated into this specification.

Figure 7:
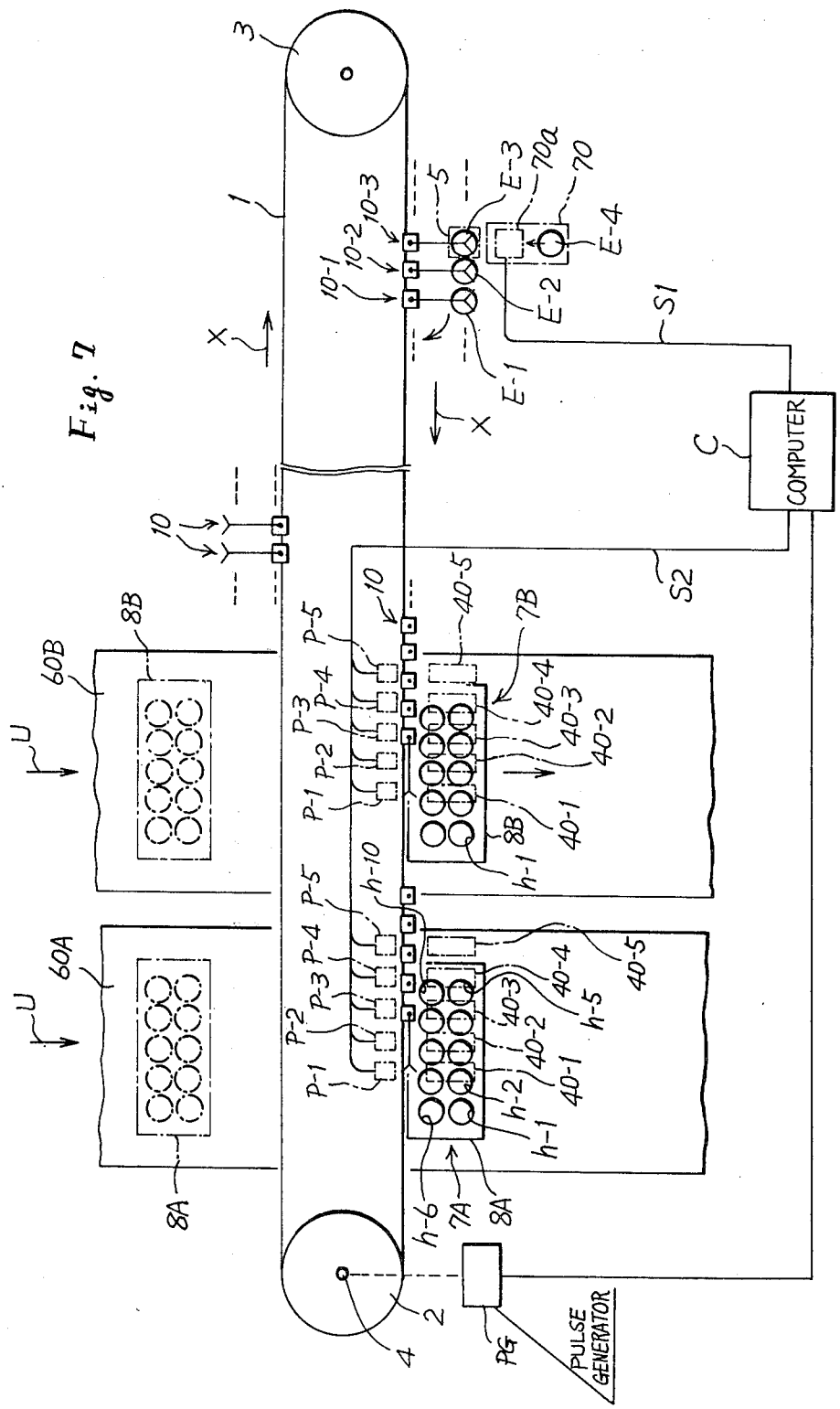
FIG. 7 is a top plan view schematically showing one embodiment of the invention.

In the embodiment of FIG. 7 only a single egg-gripping station 5 is provided. As many egg-gripping stations as are desired may be provided so that the corresponding number of holders may pick up eggs at these stations.

Although only two packaging stations are provided in the illustrated embodiment, as many packaging stations as are required by the number of sizes (e.g. seven sizes) eggs are to be separated into may be provided.

In the illustrated embodiment, the holders have their rotatable shaft 13 vertically arranged. The holders may be so arranged that their shaft 13 lies horizontally.

Any other suitable devices may be substituted for the computer C for the same purpose.

What I claim is:

1. In an apparatus for transporting objects by holders, each of which comprises a member for mounting said holder to endless conveying means circulating in a predetermined direction, a shaft rotatably mounted on said mounting member, a first arm having an outer free end and fixed at the opposite end thereof to said rotatable shaft, with the axis of said first arm crossing the axis of rotation of said rotatable shaft, so that turning of said arm about the axis of rotation of said shaft causes said shaft to be rotated about said axis of rotation of its own, and a second arm provided at one end thereof with means for releasably gripping an object and pivotally connected at the opposite end thereof to said rotatable shaft, with the axis of said second arm crossing the axis of rotation of said rotatable shaft, so that rotation of said rotatable shaft about said axis of rotation of its own causes said second arm to be turned about said axis of rotation of said shaft between a first position in which said gripping means is positioned forwardly of said axis of rotation of said rotatable shaft in the direction of circulation of said endless conveying means and a second position in which said second arm lies substantially perpendicularly to said direction of circulation, said gripping means operating to release the object gripped thereby when said second arm has been turned from said first to said second position, said apparatus further including along the path of circulation of said endless conveying means a first station at which objects supplied thereto are successively picked up by said holders and a second station provided downstream of said first station and at which said holders are caused to release said objects; a device for causing said holders to release said objects at said second station, comprising arm-turning means disposed adjacent said second station and having a member engageable with said outer free end of said first arm of a selected one of said holders to turn said first arm and consequently said second arm from said first to said second position, and arm-pushing means disposed adjacent said arm-turning means for moving said first arm of a selected one of said holders into engagement with sand engageable member of said arm-turning means.

2. The device of claim 1, wherein said arm-turning means comprises bearing means and an actuating member comprising a vertical portion journalled in said bearing means, a main portion extending downwardly aslant from the lower end of said vertical portion and an end portion depending vertically from the lower end of said main portion and engageable with said outer free end of said first arm of said selected holder.

3. The device of claim 1, wherein said arm-pushing means comprises a pushing member, means for pivotally supporting said pushing member and means for causing said pushing member to bring said first arm of said selected holder into engagement with said arm-turning means.

4. The device of claim 2, wherein said arm-pushing means comprises a pushing member, means for pivotally supporting said pushing member and means for causing said pushing member to bring said first arm of said selected holder into engagement with said end portion of said actuating member of said arm-turning means.

5. The device of claim 1, wherein while said holders are conveyed at a first velocity, the turning of said first and second arms of said selected holder from said first to said second position gives the object gripped by said gripping means of said second arm a second velocity having a direction the angle of which relative to the direction of said first velocity changes so as to eventually offset said first velocity when said second arm has been turned to said second position.

6. In an apparatus for transporting objects by holders, each of which comprises a member for mounting said holder to endless conveying means circulating in a predetermined direction, a shaft rotatably mounted on said mounting member, a first arm having an outer free end and fixed at the opposite end thereof to said rotatable shaft, with the axis of said first arm crossing the axis of rotation of said rotatable shaft, so that turning of said arm about the axis of rotation of said shaft causes said shaft to be rotated about said axis of rotation of its own, and a second arm provided at one end thereof with means for releasably gripping an object and pivotally connected at the opposite end thereof to said rotatable shaft, with the axis of said second arm crossing the axis of rotation of said rotatable shaft, so that rotation of said rotatable shaft about said axis of rotation of its own causes said second arm to be turned about said axis of rotation of said shaft between a first position in which said gripping means is positioned forwardly of said axis of rotation of said rotatable shaft in the direction of circulation of said endless conveying means and a second position in which said second arm lies substantially perpendicularly to said direction of circulation, said gripping means operating to release the object gripped thereby when said second arm has been turned from said first to said second position, said apparatus further including along the path of circulation of said endless conveying means a first station at which objects supplied thereto are successively picked up by said holders and a second station provided downstream of said first station and at which said holders are caused to release said objects; a device for causing said holders to release said objects at said second station, comprising: a plurality of arm-turning means disposed adjacent said second station in spaced apart relation to each other in the direction in which said holders are conveyed, each of said plurality of arm-turning means comprising a member engageable with said outer free end of said first arm of a selected one of said holders to turn said first arm and consequently said second arm from said first to said second position; a plurality of arm-pushing means each paired with one of said plurality of arm-turning means and each for moving said first arm of a selected one of said holders into engagement with said engageable member of the corresponding one of said plurality of arm-turning means; and control means for selectively operating said plurality of arm-pushing means in accordance with the characteristic of the objects said holders grip or the order said holders grip said objects by using clock pulses produced in accordance with the distance said endless conveying means travels.

7. The device of claim 6, wherein each of said plurality of arm-turning means comprises bearing means and an actuating member comprising a vertical portion journalled in said bearing means, a main portion extending downwardly aslant from the lower end of said vertical portion and an end portion depending vertically from the lower end of said main portion and engageable with said outer free end of said first arm of said selected holder.

8. The device of claim 6, wherein each of said plurality of arm-pushing means comprises a pushing member, means for pivotally supporting said pushing member and means for causing said pushing member to bring said first arm of said selected holder into engagement with the corresponding one of said plurality of arm-turning means.

9. The device of claim 7, wherein each of said plurality of arm-pushing means comprises a pushing member, means for pivotally supporting said pushing member and means for causing said pushing member to bring said first arm of said selected holder into engagement with said end portion of said actuating member of the corresponding one of said plurality of arm-turning means.

10. The device of claim 6, wherein said control means is an electronic computer.

11. The device of claim 6, wherein while said holders are conveyed at a first velocity, the turning of said first and second arms of said selected holder from said first to said second position gives the object gripped by said gripping means of said second arm a second velocity having a direction the angle of which relative to the direction of said first velocity changes so as to eventually offset said first velocity when said second arm has been turned to said second position.

12. An apparatus for transporting objects by holders so as to place said objects at predetermined positions, comprising: means for supplying said objects to a first station; a plurality of holders; means for conveying said holders at a first velocity in a predetermined direction from a first station where said holders pick up said objects to a second station where said holders release said objects; each of said holders comprising a rotatable shaft, a driving arm and an object-gripping arm, both of said arms being connected to said rotatable shaft so that turning of said driving arm about the axis of rotation of said rotatable shaft causes said object-gripping arm to be turned between a first position in which said object-gripping arm lies in parallel with said predetermined direction in which said holders are conveyed and a second position in which said object-gripping arm lies perpendicularly to said predetermined direction and releases the object; arm-turning means disposed adjacent said second station so as to be engageable with said first arm of a selected one of said holders to turn said first arm and consequently said second arm from said first to said second position; and arm-pushing means disposed adjacent said arm-turning means for moving said first arm of a selected one of said holders into engagement with said arm-turning means.

13. An apparatus for transporting objects by holders so as to place said objects at predetermined positions, comprising: means for supplying said objects to a first station; a plurality of holders; means for conveying said holders at a first velocity in a predetermined direction from a first station where said holders pick up said objects to a second station where said holders release said objects; each of said holders comprising a rotatable shaft, a driving arm and an object-gripping arm, both of said arms being connected to said rotatable shaft so that turning of said driving arm about the axis of rotation of said rotatable shaft causes said object-gripping arm to be turned between a first position in which said object-gripping arm lies in parallel with said predetermined direction in which said holders are conveyed and a second position in which said object-gripping arm lies perpendicularly to said predetermined direction and releases the object; a plurality of arm-turning means disposed adjacent said second station and each being engageable with said first arm of a selected one of said holders to turn said first arm and consequently said second arm from said first to said second position; a plurality of arm-pushing means each paired with one of said plurality of arm-turning means for moving said first arm of a selected one of said holders into engagement with the corresponding one of said plurality of arm-turning means; and control means for selectively operating said plurality of arm-pushing means in accordance with the characteristic of the objects said holders grip or the order said holders grip said objects by using clock pulses produced in accordance with the distance said endless conveying means travels.

14. The apparatus of claim 13, wherein each of said plurality of arm-turning means comprises bearing means and an actuating member comprising a vertical portion journalled in said bearing means, a main portion extending downwardly aslant from the lower end of said vertical portion and an end portion depending vertically from the lower end of said main portion and engageable with said outer free end of said first arm of said selected holder.

15. The apparatus of claim 13, wherein each of said plurality of arm-pushing means comprises a pushing member, means for pivotally supporting said pushing member and means for causing said pushing member to bring said first arm of said selected holder into engagement with the corresponding one of said plurality of arm-turning means.

16. The apparatus of claim 14, wherein each of said plurality of arm-pushing means comprises a pushing member, means for pivotally supporting said pushing member and means for causing said pushing member to bring said first arm of said selected holder into engagement with said end portion of said actuating member of the corresponding one of said plurality of arm-turning means.

17. The apparatus of claim 13, wherein said control means is an electronic computer.

18. The apparatus of claim 13, wherein while said holders are conveyed at a first velocity, the turning of said first and second arms of said selected holder from said first to said second position gives the object gripped by said gripping means of said second arm a second velocity having a direction the angle of which relative to the direction of said first velocity changes so as to eventually offset said first velocity when said second arm has been turned to said second position.

19. The apparatus of claim 13, wherein said objects are eggs, fruits, or other damageable objects.

* * * * *